United States Patent [19]

Buhler et al.

[11] Patent Number: 4,777,056

[45] Date of Patent: Oct. 11, 1988

[54] PROCESS FOR AGGLOMERATING FOOD PRODUCTS

[75] Inventors: Marcel Buhler, Tolochenaz; John Darbyshire, Yverdon; Michel Jaccard, Orbe, all of Switzerland

[73] Assignee: Nestec S.A., Vevey, Switzerland

[21] Appl. No.: 913,096

[22] Filed: Sep. 29, 1986

[30] Foreign Application Priority Data

Oct. 30, 1985 [CH] Switzerland .......................... 4673/85

[51] Int. Cl.$^4$ ................................................ A23P 1/02
[52] U.S. Cl. ...................................... 426/285; 426/453; 425/222
[58] Field of Search ................... 426/285, 453, 96, 621; 425/222; 264/117

[56] References Cited

U.S. PATENT DOCUMENTS

| 2,995,773 | 8/1961 | Gidlow et al. | 425/222 |
| 3,251,695 | 5/1966 | Gidlow et al. | 426/285 |
| 3,580,545 | 5/1971 | O'Brien | 425/222 |
| 3,700,461 | 10/1972 | Dickens | 426/285 |
| 3,830,943 | 8/1974 | Hex et al. | 425/222 |
| 3,834,850 | 9/1974 | Takewell et al. | 425/222 |
| 3,914,364 | 10/1975 | Engellertner et al. | 264/117 |
| 3,949,096 | 4/1976 | Johnson et al. | 426/285 |
| 4,050,869 | 9/1977 | Takewell et al. | 425/222 |
| 4,339,402 | 7/1982 | Henry | 425/222 |
| 4,353,852 | 10/1982 | Tse | 425/222 |
| 4,394,394 | 7/1983 | Nava et al. | 426/285 |
| 4,507,335 | 3/1985 | Mathur | 425/222 |
| 4,588,366 | 5/1986 | Glatt | 264/117 |
| 4,640,839 | 2/1987 | Hsu | 264/117 |

Primary Examiner—Donald E. Czaja
Assistant Examiner—Carolyn Paden
Attorney, Agent, or Firm—Vogt & O'Donnell

[57] ABSTRACT

In an inclined rotary drum, a vortex of a particulate main product is formed about an inclined axis, an agglomerating agent is sprayed onto the vortex from outside and a particulate secondary product is distributed in the vortex from inside.

13 Claims, 1 Drawing Sheet

PROCESS FOR AGGLOMERATING FOOD PRODUCTS

BACKGROUND OF THE INVENTION

This invention relates to a process for agglomerating at least two particulate food products, in which the particles of at least one secondary product are made to adhere to the particles of a main product by means of a liquid agglomerating agent.

The invention also relates to an apparatus for continuously carrying out this process, comprising an inclined rotary drum, a frame supporting the drum, drive means for rotating the drum about its axis, means for introducing the main product at the upper end of the drum and means for removing the agglomerated product at the lower end of the drum.

The problem of incorporating heat-sensitive components, such as certain proteins or certain amino acids, flavourings or vitamins, in cereal flakes obtained, for example, by roller drying or by extrusion of a cereal-based paste has been solved in various ways, including dry-mixing or agglomeration of the particles of the heat-sensitive components with the cereal flakes after drying of the flakes.

Now, the dry mixing of particulate products which often differ considerably in their granulometry and apparent density is difficult and involves the danger of overrapid separation. This risk is particularly serious when a product of relatively low bulk density is dry-mixed with a product of relatively high bulk density.

However, the known agglomeration processes intended to overcome this drawback of dry-mixing can also have certain disadvantages, particularly when the particulate products differ in their hygroscopicity.

Thus, one known process comprises moistening an intimate mixture of flakes based on starch issuing from a roller dryer and powder-form food or aromatic products with water in a fluidized bed or an agglomeration channel to make the powder adhere to the flakes. This process involves the risk of agglomerating the powder particles with one another when they are more hygroscopic than the flakes.

Similarly, another known process comprises introducing cereal flakes and a sugar syrup into a rotary drum, allowing the flakes and the syrup to mix along the first two thirds of their path in the drum and then introducing an aromatic powder of the freeze-dried ice cream type into the last third of the drum so that it adheres to the still tacky flakes. This process involves the risk of agglomerating the flakes with one another and of obtaining an irregular distribution of the powder around the flakes.

SUMMARY OF THE INVENTION

The object of the present invention is to provide a process and an apparatus which enable particulate food products differing from one another in their granulometry, bulk density and hygroscopicity to be agglomerated and which, in particular, enable the particles of a powder of comparatively high bulk density and hygroscopicity to be made to adhere uniformly to flakes of comparatively low bulk density and hygroscopicity while, at the same time, providing for very high homogeneity of the mixture of said particulate products.

To this end, the process according to the invention is characterized in that a vortex of the particles of said main product is formed about a horizontal or inclined axis, said agglomerating agent is sprayed onto the vortex from outside and the particles of said secondary product are distributed in the vortex from inside.

Similarly, the apparatus according to the invention is characterized in that it comprises means for rotating the particles of the main product about an inclined axis in a first part of said drum, at least one means for distributing secondary product in an ascending half of a second part of the drum and means for spraying the agglomerating agent into said descending half of said second part of the drum.

It has been found that this process and, in particular, this apparatus lend themselves better than known processes and apparatus to the agglomeration of particulate food products having different physical characteristics in regard to their granulometry their hygroscopicity and their bulk density. In particular, it has surprisingly been found that the particles of a comparatively more hygroscopic secondary product, such as a skimmed milk powder, for example, may be made to adhere very uniformly to particles of a comparatively less hygroscopic main product, such as cereal flakes, for example, using a relatively small quantity of agglomerating agent while, at the same time, guaranteeing very high homogeneity of the mixture of the various particles. It is assumed that this surprising result is attributable to the fact that the coating of the particles of main product with the droplets of agglomerating agent and the contacting of the particles of secondary product with the particles of the coated main product thus take place separately in space, but quasi-simultaneously in time. It is thus possible, in particular, to spray very fine droplets of agglomerating agent which coat or cover the particles of main product very uniformly, but only come into contact with them a fraction of a second before the particles of secondary product. Thus, if a sugar syrup, for example, is sprayed in the form of very fine droplets, the quantity of water which they contain does not have time either to evaporate or to penetrate sufficiently into the particles of main product for the agglomerating or adhesive effect to be lost.

In the context of the invention, the expressions "a first part and a second part or even a third part of the drum" designate slices of cylindrical space cut by planes perpendicular to the axis of the drum in the cylindrical space delimited by the wall of the drum. The parts follow one another from the upper end to the lower end of the drum.

Similarly, the expressions "ascending half and descending half of the drum" designate the semicylindrical spaces cut by the vertical plane passing through the axis of the drum in the cylindrical space delimited by the wall of the drum. The terms "ascending" or "descending" used in these expressions locate the two "halves" in relation to the axis of the drum by designating the side where the wall of the drum makes an ascending or descending movement at axis level.

DETAILED DESCRIPTION OF THE INVENTION AND DESCRIPTION OF PREFERRED EMBODIMENTS

To carry out the process according to the invention, the vortex of particles is preferably formed in a rotary drum, the rotation of the vortex being maintained by gravitation and by friction against the wall of the drum.

This is because it is possible to form a vortex of particles which rotate about an axis in a rotary drum, the friction against the wall of the drum imparting an upward impulse to the ascending side of the vortex and gravitation ensuring the downward falling movement of the descending side of the vortex. A vortex such as this is adjacent the wall of the drum in the ascending half of the drum and leaves an empty space in the descending half of the drum. The agglomerating agent may thus be sprayed onto the descending side of the vortex from the space left free between the vortex and the wall of the drum in the descending half of the drum.

The axis of rotation of a vortex such as this is substantially parallel to the axis of the drum and is situated at substantially the same level in the ascending half of the drum. The particles of said secondary product may be distributed in the vortex from an inner zone of the vortex coinciding with or close to its axis of rotation. For example, the particles of secondary product may be distributed in the form of a curtain falling from the distribution zone into the lower part of the vortex.

Although the process may be carried out in batches, in some cases with certain advantages, it is generally preferred to carry out the process continuously. Thus, said vortex of particles may be formed in an inclined drum, the main product may be continuously introduced into the vortex at the upper end of the drum and the agglomerated product may be continuously removed from the vortex, i.e., collected, at the lower end of the drum.

The nature of the particles of the main food product which lends itself to the process according to the invention may vary. The particles may be granules of a freeze-dried product or flakes obtained by roller drying of a cereal paste, for example. The particles in question may also be expanded cereals obtained by extrusion cooking of a moistened cereal flour and having various shapes, such as, for example, stars, rings or flakes of relatively large size.

The secondary particulate food products which lend themselves to the process according to the invention are preferably in the form of a relatively fine powder, although other forms of granulometry similar to those of the main product are also possible. For example, the process according to the invention may be used to agglomerate at least two different secondary products in the form of flakes or granules with a main product itself in the form of flakes or granules. However, the process according to the invention is particularly suitable for making a powder containing heat-sensitive components, such as, for example, certain proteins or certain amino acids, vitamins, flavourings or pigments, adhere to the particles of said main product.

The edible liquid agglomerating agents suitable for carrying out the process according to the invention may also be of various types. It is sufficient that they be, on the one hand, finely sprayable and, on the other hand, capable of exerting an agglomerating or adhesive effect between the particles of the main product and the particles of the second product. It is even possible to use a non-aqueous liquid, such as, for example, a molten fat. However, the process according to the invention is particularly suitable for agglomeration by means of a syrup of sugar and/or starch, particularly a syrup of high dry matter content.

Thus, in one particular embodiment of the process according to the invention, the particles of the main product are flakes of cereals obtained by roller drying of a paste based on cereals, the secondary product is a skimmed milk powder and the agglomerating agent is a syrup of sugar and/or starch.

In another particular embodiment of the process according to the invention, the particles of the main product are expanded cereals obtained by extrusion cooking of a moistened cereal flour, the secondary product is a powder of fruit, cocoa or sugar and the agglomerating agent is a syrup of sugar and/or starch.

Preferably and in general, where the process according to the invention is carried out continuously, 65-85 parts by weight of particulate main product having a bulk density of 90-200 g/l and a water content of 0.5-12% by weight are introduced hourly into the vortex, 15-30 parts by weight of syrup of sugar and/or starch having a water content of 15-60% by weight are sprayed hourly onto the vortex, 3-30 parts by weight of secondary particulate product having a water content of 0-12% by weight are distributed hourly in the vortex and 102-118 parts by weight of agglomerated particulate product having a bulk density of 120-250 g/l and a water content of 2.0-15% by weight are removed hourly from the vortex.

The process according to the invention is particularly appropriate for making a minor quantity of secondary particulate product adhere to a major quantity of a particulate main product of relatively low apparent density so as to retain the shape and individual character of the particles of main product and to obtain an agglomerated particulate product also having a relatively low bulk density.

In the particular embodiment relating to the expanded cereals intended, in particular, for consumption as breakfast cereals, the quantitites of secondary particulate product used are generally relatively modest, the objective generally being to improve the appearance and organoleptic qualities of the main product. It is thus precisely possible by the process according to the invention to cover the surface of relatively large particles of main product particularly uniformly with relatively small particles of secondary product.

With regard to the particular embodiment relating to the cereal flakes intended, in particular, for reconstitution in the form of an instant pap, it should be noted that it is possible to obtain by roller drying flakes of cereal having a very low bulk density, which provides the reconstituted product with an unctuous texture, and a very low water content which provides the flakes with good keeping qualities.

The process according to the invention enables most of these qualities to be retained in the agglomerated end product which generally has a water content of 2.0-6.5% by weight. Where the agglomerated end product has a water content of 4.0-6.5% by weight, it may in any case be of advantage to carry out post-drying after agglomeration. However, it has been found that it is possible, particularly where syrup of very high dry matter content is used, to obtain a water content of 2.0-4.0% by weight which enables the post-drying step to be omitted if required.

In this embodiment, the process enables a skimmed milk powder, of which the particles generally have a mean diameter of the order of 0.1-0.2 mm, to be made to adhere to cereal flakes generally having a thickness of 0.5-1.0 mm and a mean diameter of 2-5 mm in such a regular and uniform manner that the dimensions and shape of the flakes are remarkably preserved while the bulk density of the flakes remains low enough for the unctuous qualtiies of the reconstituted product to be preserved.

The process according to the invention thus enables the syrup to be sprayed in the form of very fine droplets. Thus, the syrup may be sprayed under pressure in the form of a mist. So as not to risk blocking the spray nozzle(s) or losing any of the agglomerating or adhesive effect, it is preferable where necessary to spray the syrup at a temperature above the crystallization temperature of the sugar. With a sucrose solution having a dry matter content of 58–85% by weight, for example, the appropriate temperature is at least 70°–120° C. and the pressure in the spray nozzle may be of the order of 12–25 bar, for example. Where the spray nozzle used is one in which the dispersion of a jet of solution is ensured by a concentric jet of air, it has been found that it is of advantage to use an air temperature much higher than the temperature of the solution, for example, 150°–250° C., and that lower pressures may be applied.

In cases where it is desired to obtain an end product containing little or no sugar, a starch syrup may advantageously be used. Starch syrups may be obtained by hydrolysis of cereals, for example. Syrups such as these pose problems of adhesion and viscosity from much lower dry matter contents. It is possible with advantage to use syrups containing 35–45% by weight, based on dry matter, of hydrolyzed starch having a DE (dextrose equivalent) of 30–60 for example.

In addition, in one particular embodiment of the process according to the invention, the vortex is heated or cooled. In this way, it is possible in particular to influence certain properties of the end product, particularly its water content or the possibly overly tacky nature of its surface. Heating may be carried out, for example, by convection, radiation or contact. Similarly, cooling may be carried out, for example, by convection or contact.

Finally, so far as the total residence time of the particles in the vortex is concerned, it may advantageously be from a few tens of seconds to a few minutes, for example, of the order of 1–3 minutes. However, it is important to note that it is not the residence time of the particles in the vortex which determines the success of the process according to the invention, but rather the fact that the coating of the particles of main product with the droplets of agglomerating agent and the contacting of the particles of secondary product with the particles of the coated main product take place separately in space, but quasi-simultaneously in time.

The apparatus for continuously carrying out the process according to the invention is thus distinguished, in particular, by the fact that it comprises means for rotating the particles of main product to form said vortex in the first part of the inclined drum, this vortex then moving on as it were towards the lower end of the drum by virtue of the general spiral movement of the particles in the vortex. The means for rotating the particles advantageously consist of projecting elements disposed against the wall of the drum in its first part. They are preferably in the form of radial fins fixed to the wall of the drum.

The apparatus is further characterized in that it contains at least one means for distributing secondary product in the ascending half in the second part of the drum, these means thus being located inside the space intended to be occupied by the vortex. These means advantageously have a linear configuration so as to distribute the product in particular along a line parallel to or even coincident with the axis of the vortex. This distribution means preferably comprises a tube which is connected at one end to a metering unit, is open at its other end, is drilled with holes underneath and is arranged parallel to the axis of the drum.

So far as the means for spraying the agglomerating agent is concerned, it may also advantageously have a linear configuration or may at least ensure spraying of the agglomerating agent over a fraction of the length of the vortex corresponding approximately to the fraction of the length of the vortex in which said particulate secondary product is distributed. This spray means preferably comprises several high-pressure spray nozzles arranged along an axis parallel to the axis of the drum. The preferred means for distributing the secondary product and spraying the agglomerating agent are thus parallel to one another in said second part of the drum. In view of the spread of the beam of droplets projected by each nozzle, the spray means is advantageously located at mid-height in the drum.

In order to ensure constant friction conditions between the vortex and the wall of the drum, the apparatus may additionally comprise at least one scraper blade disposed against the wall of the drum parallel to its axis in said second part at the top of said ascending half. It is advantageously positioned in such a way that the scraped particles drop back near the spray means, for example, in such a way that they drop back into a space left free between the spray means and the wall of the drum.

In one particular embodiment, the apparatus according to the invention additionally comprises means for cooling or heating the vortex in a third part of the drum. This means may be in the form of openings for the distribution of hot or cold air or in the form of elements for heating or cooling the wall of the drum, for example. An infrared or microwave heating system, for example, may also be provided.

In addition, each end of the drum may advantageously be provided with an annular retaining diaphragm having an external diameter equal to and an internal diameter smaller than that of the drum while a fixed retaining plate may be provided against the lower end of the drum in the extension of its ascending half. The retaining diaphragm provided at the upper end of the drum is intended to prevent particles of main product from leaving the drum at the moment when they are rotated by the rotation means. The retaining diaphragm arranged at the lower end of the drum is intended to retain the particles of agglomerated product ready for removal so as to facilitate adjustment of the residence time of the product in the drum. Similarly, the closure plate is intended to apply a slight pressure to the lower end of the vortex which assists in ensuring its cohesion or spatial definition.

Finally, the frame supporting the drum may advantageously be provided with a mechanism to enable the inclination of the drum to be regulated. This is because, for a drum of given dimensions, the residence time of the product in the drum depends directly on that inclination. It it is desired to modify the output of the production line, it is of advantage also to be able to adapt the residence time of the product in the drum. For a drum 1 meter in length and 0.7 m in diameter and for outputs of approximately 400–1200 kg of agglomerated product per hour, it is possible to use an inclination of 10°–15° for example. Under these conditions and with a rotational speed of the drum of approximately 16–22 r.p.m. sufficient to form the vortex, the residence time of the particles of main product in the drum may be approximately 1-3 minutes while the instantaneous charge of the drum, i.e., the weight of the vortex, may be of the order of 50 kg.

The apparatus for continuously carrying out the process according to the invention is described hereinafter with reference to the accompanying drawings.

DETAILED DESCRIPTION OF THE DRAWINGS AND PREFERRED EMBODIMENTS

Figure 1:
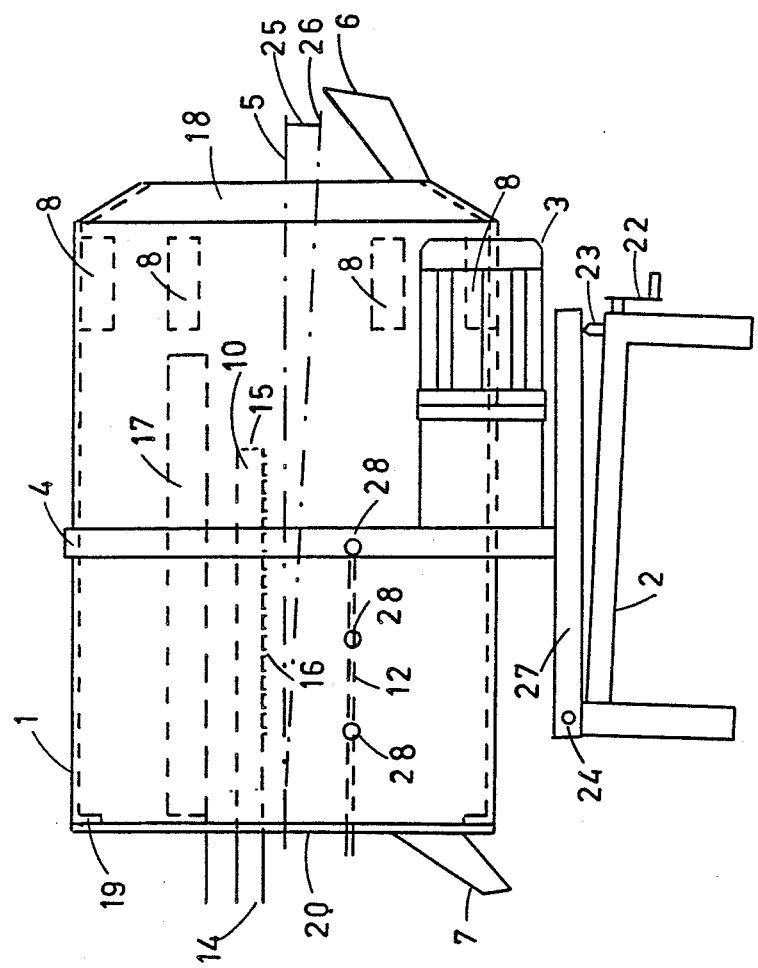
FIG. 1 is a diagrammatic side elevation of one embodiment of the apparatus.
Figure 2:
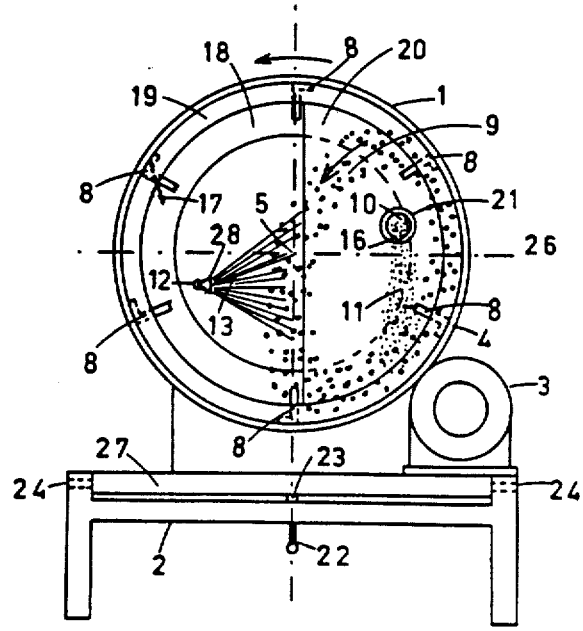
FIG. 2 is a diagrammatic front view of the apparatus shown in FIG. 1.

The apparatus shown in FIGS. 1 and 2 comprises an inclined drum 1, a frame 2 supporting the drum, drive means 3, 4 for rotating the drum about its axis, means 6 for introducing the main product at the upper end of the drum and means 7 for removing the agglomerated product at the lower end of the drum.

The introduction means 6 and removal means 7 are fixed funnels or channels which are not integral with the drum.

The drive means consist of a variable-speed motor 3 which transmits the rotational movement to the drum by friction on a drive ring 4 fixed to the drum.

The apparatus additionally comprises means 8 for rotating the particles 9 of main product about an inclined axis in the first part of the drum extending axially from its upper end, means 10 for distributing secondary product 11 in the ascending half of the second part of the drum which follows the first part and extends axially to the lower end of the drum and means 12 for spraying the agglomerating agent 13 into the descending half of the second part of the drum.

The means 8 for rotating the particles 9 is formed by radial fins fixed to the wall of the drum.

The means 10 for distributing secondary product 11 is fixed, but not integral with the drum and comprises a tube which is connected at its upstream end 14 to a metering unit (not shown), is open at its downstream end 15, is drilled with holes 16 underneath and is arranged parallel to the axis 5 of the drum. the distribution means 10 is disposed in the space intended to be occupied by the vortex. The vortex is shown in section in FIG. 2 and rotates about an axis substantially parallel to the axis 5 of the cylinder. The distribution means 10 is thus intended to distribute the particles 11 of secondary product along a line parallel to and situated slightly above the axis of the vortex.

The means 12 for spraying the agglomerating agent 13 is fixed, but not integral with the drum and comprises three high-pressure spray nozzles 28 disposed substantially at mid-height in the drum along an axis parallel to the axis of the drum. The spray means 12 is disposed outside the space intended to be occupied by the vortex and is parallel to the distribution means 10 itself disposed in the space intended to be occupied by the vortex.

The apparatus shown also comprises a scraper blade 17 which is fixed, but not integral with the drum and which is disposed against the wall of the drum parallel to the spray means 12, but above and at a greater distance from the vertical plane passing through the axis 5 of the cylinder so that the scraped particles do not drop onto the spray means.

The apparatus additionally comprises an annular retaining diaphragm 18 at the upper end of the drum, an annular retaining diaphragm 19 at the lower end of the drum and a closure plate 20 disposed against the lower end of the drum. The two annular retaining diaphragms 18 and 19 are fixed to the wall of the drum and each define an opening smaller in diameter than the drum. The closure plate 20 is fixed, but not integral with the drum, is formed with an opening 21 through which the distribution means 10 passes and is semicircular in shape. It is disposed against the lower end of the drum in the extension of its ascending half, i.e. in the extension of the space intended to be occupied by the vortex.

Finally, the frame 2 supporting the drum is provided with a mechanism 22,23,24 for regulating the inclination 25 of the drum relative to the horizontal plane 26. The inclination adjusting mechanism comprises a crank actuating a lever 23 which causes a table 27 supporting the drum to pivot about an axis passing through bearings 24 formed in the frame 2.

The process according to the invention is illustrated by the following Examples in which the percentages and parts are by weight.

EXAMPLES

EXAMPLE 1

To prepare an instant dehydrated pap in the form of flakes, cereal flakes prepared by roller drying of a cereal paste are used as the main product. These flakes have a thickness of approximately 0.6-0.7 mm, a mean diameter of approximately 2-3 mm, a bulk density of 90 g/l and a water content of 2.5%. Their composition is that of a wheat flour to which 6.25% skimmed milk powder, based on dry matter, has been added.

The secondary product used is skimmed milk powder to which a premix of skimmed milk powder, vitamins and iron pyrophosphate is added so that the respective concentrations of these two additives in the end product are 0.15% and 0.036%, based on dry matter. This skimmed milk powder has a bulk density of approximately 600 g/l and a water content of 4%. It consists of particles having a mean diameter of approximately 0.1-0.2 mm.

The agglomerating agent used is a sucrose syrup having a dry matter content of 70% heated to 75° C.

The secondary product and the main product are agglomerated with the agglomerating agent, in other words the skimmed milk powder is made to adhere to the cereal flakes with the hot sugar syrup in an apparatus similar to that described above with reference to the drawing, of which the drum has a length of 1 meter, a diameter of 0.7 meter and an inclination of 15°.

The cereal flakes are introduced into the drum at its upper end at a rate of 850 kg/h. The drum is rotated at 16-20 r.p.m. so that the cereal flakes are rotated about an axis susbstantially parallel to that of the drum in its ascending half. Once they have been set rotating in the first part of the drum by the radial fins fixed to its wall, the particles continue their rotational movement while descending slowly along the drum in a spiral movement, all the moving particles constituting a well-defined integral vortex.

252 kg/h of skimmed milk powder containing 25 kg of the premix of skimmed milk powder, vitamins and iron pyrophosphate are distributed in the vortex by a distribution means consisting of a tube 7 cm in diameter which is drilled underneath with a plurality of holes 4 mm in diameter over a width of 2.5 cm and a length of 20 cm and which is disposed in the vortex parallel to and slightly above its axis at a distance of 50 cm from the lower end of the drum. The milk powder thus distributed descends in the form of a curtain of powder and immediately mixes intimately with the vortex.

171 kg/h of sucrose syrup are sprayed at 75° C. onto the descending side of the vortex at a distance of 20–30 cm from the vortex by a spray means consisting of three nozzles arranged along the axis parallel to the axis of the drum at intervals of 15 cm from its lower end. Spraying is carried out under a pressure of 15 bar with the aid of 3 concentric air jets at 150° C. or under a pressure of 25 bar without the assistance of concentric air jets so that the three beams of microscopic droplets projected against the vortex form a genuine mist which envelops and immediately coats the particles of the vortex. 1298 kg/h of agglomerated product having a water content of 6.44%, a bulk density of 180 g/l and a granulometry comparable with that of the cereal flakes of said main product are removed or collected at the lower end of the drum.

it was found that this agglomeration process did not cause any loss of lysine.

It was also found that the mixing index, defined as the quotient of the mean deviation from the means concentration of a given component in the end product, is 3.7% for proteins, 8% for iron and 12.5% for vitamin C. This proves that this agglomeration process also guarantees very high homogeneity of the mixture, in other words high homogeneity of the composition of separate samples of the agglomerated product.

The agglomerated product is then subjected to post-drying for 3 minutes at 80° C., during which its water content is reduced to 2.5%, again without any loss of lysine.

EXAMPLE 2

The procedure is as described in Example 1, except that half the hourly quantities indicated are used. To this end, the inclination of the drum is adjusted to 10° instead of 15° in relation to the horizontal plane. An agglomerated product comparable with that of Example 1 is obtained.

EXAMPLE 3

The procedure is as described in Example 1, except that a sucrose syrup having a dry matter content of 75% heated to 80° C. is used as the agglomerating agent. 1287 kg/h of agglomerated product having a water content of 5.6% and qualities comparable with those of the agglomerated product of Example 1 are obtained.

EXAMPLE 4

To prepare an instant dehydrated pap in the form of flakes, cereal flakes prepared by roller drying of a cereal paste are used as the main product. These flakes have a thickness of 0.6–0.7 mm, a mean diameter of 2–3 mm, a bulk density of 90 g/l and a water content of 2.5%. Their composition is as follows (in % based on dry matter):

| | |
|---|---|
| hydrolyzed wheat flour | 31.4 |
| non-hydrolyzed wheat flour | 50.0 |
| butter oil | 3.0 |
| vegetable oil | 8.9 |
| skimmed milk | 6.7 |

The secondary product used is skimmed milk powder enriched in iron and vitamins having a bulk density of approximately 600 g/l and a water content of 4% and consisting of particles having a mean diameter of approximately 0.1–0.2 mm.

The agglomerating agent used in a sucrose syrup having a dry matter content of 75% heated to 80° C.

With the same apparatus and in the same way as in Example 1, a vortex of the cereal flakes is formed, 800 kg/h of these flakes are introduced into the vortex, 159 kg/h of the sucrose syrup is sprayed onto the descending side of the vortex at 80° C., 275 kg/h of skimmed milk powder are distributed in the vortex and 1244 kg/h of agglomerated product are collected or removed from the vortex.

The agglomerated product obtained has a water content of 5.7%, a bulk density of 175 g/l and a ganulometry comparable with that of the flakes of said main product. It has the following composition (in %, based on dry matter):

| | |
|---|---|
| hydrolyzed wheat flour | 21.0 |
| non-hydrolyzed wheat flour | 33.6 |
| skimmed milk | 27.2 |
| sucrose | 10.2 |
| vegetable oil | 6.0 |
| butter oil | 2.0 |

It was found that the agglomeration process did not cause any loss of lysine in relation to the respective lysine contents of the main and secondary products. It was also found that the mixing index was very good, namely approximately 3–4% for proteins, approximately 8% for iron and approximately 12% for vitamin C.

The agglomerated product is then subjected to post-drying for approximately 3 minutes at 80° C., during which its water content is reduced to 2.5%, again without any loss of lysine.

EXAMPLE 5

To prepare an instant dehydrated pap in the form of flakes without gluten or sucrose, cereal flakes prepared by roller drying of a cereal paste are used as the main product. These flakes have a thickness of approximately 0.6–0.7 mm, a mean diameter of approximately 2–3 mm, a bulk density of approximately 90 g/l and a water content of 1.7%. Their composition is as follows (in %, based on dry matter):

| | |
|---|---|
| hydrolyzed corn flour | 40 |
| non-hydrolyzed corn flour | 48 |
| butter oil | 3 |
| vegetable oil | 9 |

The secondary product used is skimmed milk powder enriched with iron and vitamins having a bulk density of approximately 600 g/l and a water content of 3.3% and consisting of particles having a mean diameter of approximately 0.1–0.2 mm.

A syrup of hydrolyzed corn flour having a dry matter content of 41% and a DE of 55 and heated to 85° C. is used as the agglomerating agent.

With the same apparatus and in the same way as in Example 1, a vortex of the cereal flakes is formed, 800 kg/h of these flakes is introduced into the vortex, 83 kg/h of the hydrolyzed corn flour syrup heated to 85° C. are sprayed onto the descending side of the vortex, 359 kg/h of skimmed milk powder are distributed in the vortex and 1242 kg/h of agglomerated product are collected or removed from the vortex.

This agglomerated product has a water content of 5.9%, a bulk density of approximately 200 g/l and a granulometry comparable with that of the flakes of said main product. This product, free from gluten and sucrose, has the following composition (in %, based on dry matter):

| hydrolyzed corn flour | 29.8 |
|---|---|
| non-hydrolyzed corn flour | 32.4 |
| skimmed milk | 29.8 |
| vegetable oil | 6.1 |
| butter oil | 1.9 |

The agglomerated product is then subjected to post-drying for a few minutes at 80° C., during which its water content is reduced to 2.5%.

EXAMPLE 6

To prepare breakfast cereals, expanded cereals in the form of stars, rings or almonds having dimensions of the order of 1 cm and obtained by extrusion cooking of a flour of moistened cereals containing sugar, salt, malt and fats are used as the main product. These expanded cereals have been predried. They have a bulk density of 110 g/l and a water content of 1%. Their composition is as follows (in %, based on dry matter):

| corn flour | 70 |
|---|---|
| wheat flour | 17 |
| sucrose | 7 |
| sodium chloride | 1 |
| malt | 3 |
| fats | 2 |

The secondary product used is a vitamin-enriched apricot powder having a bulk density of 737 g/l and a water content of virtually 0% and consisting of particles having a mean diameter below 0.3 mm.

A sucrose syrup having a dry matter content of 78% heated to 80° C. is used as the agglomerating agent.

The secondary product and main product are agglomerated with the agglomerating agent, in other words the apricot powder is made to adhere to the expanded cereals with the aid of the hot sugar using the same apparatus and the same procedure as in Example 1.

To this end the inclination and rotational speed of the drum are adjusted to adequate values of 10°–15° and 16–22 r.p.m., respectively, and a vortex of the expanded cereals is formed, 500 kg/h of these cereals are introduced into the vortex, 180 kg/h of the sucrose syrup are sprayed onto the descending side of the vortex, 20 kg/h of apricot powder are distributed in the vortex and 700 kg/h of agglomerated product having a bulk density of 150 g/l and a water content of 5.6% are collected or removed from the vortex.

The breakfast cereals thus obtained have all the qualities of the starting expanded cereals together with all the flavour of the apricot powder. These cereals may even be subjected to post-drying for a few minutes at 80° C. to reduce their moisture content to 2.5% without affecting their flavour.

EXAMPLE 7

To prepare breakfast cereals, expanded cereals in the form of flakes having a mean diameter of 1–2 cm for a thickness of 1–2 mm and the same composition as the expanded cereals of Example 6, a bulk density of 100 g/l and a water content of 8% are used as the main product.

The secondary product used is a cocoa powder having a bulk density of 440 g/l, a water content of 4.4% and consisting of particles having a mean diameter below 0.3 mm.

A sucrose syrup having a dry matter content of 70% heated to 70° C. is used as the agglomerating agent.

With the same apparatus and in the same way as in Example 6, 35 kg/h of this cocoa powder are made to adhere to 700 kg/h of these expanded cereals using 210 kg/h of the sucrose syrup. An agglomerated product having a water content of 14% is obtained. After post-drying for several minutes at 80° C., breakfast cereals having a water content of 2.5% and a bulk density of 150 g/l are obtained.

These cereals have a strong chocolate flavour and colour.

EXAMPLE 8

To prepare breakfast cereals, cornflakes having a mean diameter of 1–2 cm and obtained by steeping, crushing and drying of grains of corn are used as the main product. These flakes have a bulk density of 100 g/l and a water content of 9%.

The secondary product used is sucrose in the form of icing sugar having a mean particle diameter below 0.1 mm. This icing sugar has a water content of 0% and a bulk density of 675 g/l.

A sucrose syrup having a dry matter content of 75% heated to 80° C. is used as the agglomerating agent.

With the same apparatus and in the same way as described in Example 6, 25 kg/h of the icing sugar are made to adhere to 500 kg/h of the cornflakes using 200 kg/h of the sucrose syrup. 725 kg/h of agglomerated product having a water content of 7% are obtained. After post-drying for a few minutes at 80° C., breakfast cereals having a water content of 2.5% and a bulk density of 140 g/l are obtained.

These sugared flakes have a surface of surprising snowy appearance due to a particular crystallization of the sugar applied with such little water.

EXAMPLE 9

To prepare breakfast cereals, expanded cereals in the form of flakes similar in their dimensions to the flakes used in Example 7 are used as the main product. These flakes have a bulk density of 100 g/l and a water content reduced to 1% by predrying.

Expanded cereals in the form of needles approximately 5 mm long and 1–1.2 mm wide also having a water content of 1%, but a bulk density of 150 g/l are used as the secondary product.

A sucrose syrup having a dry matter content of 80% heated to 90° C. is used as the agglomerating agent.

With the same apparatus and in the same way as described in Example 6, 50 kg/h of the cereal needles are made to adhere to 500 kg/h of the cornflakes using 175 kg/h of the sucrose syrup. 725 kg/h of agglomerated product having a bulk density of 150 g/l and a water content of 2.8% are obtained.

These breakfast cereals have a very natural fibrous appearance.

We claim:

1. A process for agglomeration of at least two particulate food products, in which particles of at least one secondary product are made to adhere to particles of a main product by means of a liquid agglomerating agent, comprising forming a vortex of the particles of said main product about a horizontal or inclined axis, spraying and agglomerating agent onto the vortex from outside and distributing the particles of said secondary product in the vortex from inside.

2. A process as claimed in claim 1, wherein the vortex of particles is formed in a rotary drum, rotation of the vortex being maintained by gravitation and by friction against the drum wall.

3. A process as claimed in claim 2, wherein said agglomerating agent is sprayed onto the vortex from a space left free between the vortex and the drum wall in a descending half of the drum.

4. A process as claimed in claim 1, wherein the vortex of particles is formed in an inclined drum, said particulate main product is continuously introduced into the vortex at an upper end of the drum and agglomerated product is continuously removed from the vortex at a lower end of the drum.

5. A process as claimed in claim 1, wherein the particles of said main product are cereal flakes obtained by roller drying of a paste based on cereals, the secondary product is a skimmed milk powder and the agglomerating agent is a syrup of sugar or starch or sugar and starch.

6. A process as claimed in claim 1, wherein the particles of the main product are expanded cereals obtained by extrusion cooking of a moistened cereal flour, the secondary product is a powder or fruit, cocoa or sugar and the agglomerating agent is a syrup of sugar or starch or sugar and starch.

7. A process as claimed in claim 1, wherein 65-85 parts by weight of particulate main product having a bulk density of 90-200 g/l and a water content of 0.5-12% by weight are introduced hourly into the vortex, 15-30 parts by weight of a syrup of sugar or starch or sugar and starch having a water content of 15-60% by weight are sprayed hourly onto the vortex, 3-30 parts by weight of particulate secondary product having a water content of 0-12% by weight are distributed hourly in the vortex and 102-118 parts by weight of particulate agglomerated product having a bulk density of 150-250 g/l and a water content of 2.0-15% by weight are removed hourly from the vortex.

8. A process as claimed in claim 5 or 6 or 7, wherein the syrup contains sugar and is sprayed under pressure in the form of a mist at a temperature above the crystallization temperature of said sugar.

9. A process as claimed in claim 1, wherein the vortex is heated or cooled.

10. A process for the agglomeration of at least two particulate food products comprising:
   rotating particles of a main food product about an inclined axis with a wall of a rotary drum for forming a vortex of the particles having an outer side which leaves a space between the wall of the drum and the outer side in a descending half of the drum and the vortex having an inner side rotating about an inner zone including the inclined axis;
   spraying a liquid agglomerating agent onto the vortex of particles from the space between the wall of the drum and the outer side of the vortex in the descending half of the drum for coating the particles with the agglomerating agent; and
   distributing particles of at least one secondary food product into the vortex of particles from within the inner zone of the vortex in an ascending half of the drum for contacting and coating the agglomerating agent coated particles with the secondary food product for obtaining an agglomerated product.

11. A process as claimed in claim 10, wherein the secondary product particles are distributed along a line substantially parallel with the axis of the vortex of particles.

12. A process as claimed in claim 10 or 11, wherein the secondary product particles are at least distributed into the vortex of particles over a fraction of a length of the axis of the vortex of particles.

13. A process as claimed in claim 12, wherein the agglomerating agent is sprayed onto the main food product particles over a length of the axis of the vortex which corresponds approximately to the length the secondary product particles are distributed into the vortex.

* * * * *

UNITED STATES PATENT AND TRADEMARK OFFICE
CERTIFICATE OF CORRECTION

PATENT NO. : 4,777,056

DATED : Oct. 11, 1988

INVENTOR(S) : Marcel BUHLER, et al.

It is certified that error appears in the above-identified patent and that said Letters Patent is hereby corrected as shown below:

Column 4, line 57, insert --a-- after "where".

Column 5, line 1, "qualtiies" should be --qualities--.

Column 7, line 47, the third occurrence of "the" should be --The--.

Column 8, line 6, "closeure" should be --closure--.

Column 9, line 25, "it" should be --It--.

Column 10, lines 23-24, "ganulometry" should be --granulometry--.

Column 13, line 40, [line 4 of claim 6], the first occurrence of "or" should be --of--.

Signed and Sealed this

Ninth Day of May, 1989

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,777,056

DATED : Oct. 11, 1988

INVENTOR(S) : MArcel BUHLER, et al.

It is certified that error appears in the above-identified patent and that said Letters Patent is hereby corrected as shown below:

On the Title page, wherein the number of claims and drawings are set forth, "1 Drawing Sheet" should be --2 Drawing Sheets--.

After the Title Page and Drawing Sheet 1, depicting Figure 1, and before the beginning of text at column 1, insert Drawing Sheet 2, Figure 2, as shown on the attached page.

Signed and Sealed this

Eleventh Day of July, 1989

Attest:

DONALD J. QUIGG

Attesting Officer

Commissioner of Patents and Trademarks